US011294653B2

(12) United States Patent
Shukla et al.

(10) Patent No.: US 11,294,653 B2
(45) Date of Patent: Apr. 5, 2022

(54) METHODS AND SYSTEMS OF DISASSEMBLING EXECUTABLE CODE

(71) Applicants: Jayant Shukla, Sierra Madre, CA (US); Abhay Kanhere, Fremont, CA (US)

(72) Inventors: Jayant Shukla, Sierra Madre, CA (US); Abhay Kanhere, Fremont, CA (US)

( * ) Notice: Subject to any disclaimer, the term of this patent is extended or adjusted under 35 U.S.C. 154(b) by 0 days.

(21) Appl. No.: 15/716,517

(22) Filed: Sep. 27, 2017

(65) Prior Publication Data

US 2019/0095183 A1 Mar. 28, 2019

(51) Int. Cl.
*G06F 9/44* (2018.01)
*G06F 8/53* (2018.01)
*G06F 21/14* (2013.01)
*G06F 21/52* (2013.01)
*G06F 21/57* (2013.01)

(52) U.S. Cl.
CPC ............... *G06F 8/53* (2013.01); *G06F 21/14* (2013.01); *G06F 21/52* (2013.01); *G06F 21/577* (2013.01); *G06F 2221/033* (2013.01)

(58) Field of Classification Search
CPC ....................................................... G06F 8/53
USPC ......................................................... 717/136
See application file for complete search history.

(56) References Cited

U.S. PATENT DOCUMENTS

| | | | | |
|---|---|---|---|---|
| 5,682,535 A * | 10/1997 | Knudsen | ................... | G06F 8/31 707/999.001 |
| 6,292,933 B1 * | 9/2001 | Bahrs | ................... | H02M 3/285 707/999.202 |
| 6,772,340 B1 * | 8/2004 | Peinado | ................... | G06F 21/10 380/201 |
| 7,844,829 B2 * | 11/2010 | Meenakshisundaram | ................... | G06F 12/1483 380/277 |
| 8,397,241 B2 * | 3/2013 | Xiaocheng | ............... | G06F 9/544 719/312 |
| 8,468,501 B2 * | 6/2013 | Subhraveti | .......... | G06F 11/3636 714/38.1 |
| 8,533,836 B2 * | 9/2013 | Saunders | ................ | G06F 21/56 726/24 |
| 9,300,759 B1 * | 3/2016 | Jorgensen | ................ | G06F 9/541 |
| 9,569,288 B2 * | 2/2017 | Cui | ......................... | G06F 9/542 |
| 9,886,577 B2 * | 2/2018 | Sahita | ...................... | G06F 21/56 |
| 9,917,855 B1 * | 3/2018 | Li | ........................... | G06F 21/566 |
| 10,909,236 B2 * | 2/2021 | Mehta | ...................... | G06F 21/54 |
| 2012/0233612 A1 * | 9/2012 | Beckett | ............... | G06F 9/45533 718/1 |
| 2014/0298420 A1 * | 10/2014 | Barton | .................... | H04L 63/10 726/4 |

FOREIGN PATENT DOCUMENTS

EP 3449375 B1 * 12/2020 .......... G06F 11/3452

* cited by examiner

*Primary Examiner* — Evral E Bodden

(57) ABSTRACT

In another aspect, method useful for monitoring of an API/system call implemented by an application for generating disassembly of an executable binary of the application, includes the steps of scanning a computer system for an executable application. The method includes the step of scanning the computer system for a running process associated with the executable binary. The method includes the step of initiating an application programming interface (API) call monitoring method that associates an observed API/system call with the executable binary. The method includes the step of reporting a set of collected events to a local server.

8 Claims, 9 Drawing Sheets

METHODS AND SYSTEMS OF DISASSEMBLING EXECUTABLE CODE

BACKGROUND

An executable binary of a computer program consists of a set of machine instructions for a specific processor. While a computer program is written in a human-readable higher-level programming language, its corresponding executable binary is not in human-readable form. The conversion of a computer program into an executable binary is done by compilers that turn human-readable code into machine instructions. An assembler then merges several binary code files into a single program.

While the conversion of a computer program is necessary for its execution on a microprocessor, machine instructions are difficult for humans to work with, and there are instances where it is desirable to be able to convert the machine instructions back into a higher-level programming language or some other human-readable form. One example is program debugging, where the easiest way to find logical errors and correct the sequence of machine instructions to be executed is to map back to the original computer program, make the changes, and recompile to generate the fixes. The conversion of an executable binary back into human-readable machine instructions, i.e., the inverse of the process of assembling an executable binary, is called disassembly.

While the process of converting a computer program into executable binary is relatively straightforward and deterministic, its inverse is not, because the mapping from the binary executable to human-readable code is not unique. Variable-length instruction sets lead to multiple ways to parse any given stream of executable binary code. To add to this interpretation problem, application data is often intermingled with the stream of machine instructions, making it difficult to tell the two apart. Last, assembly of a computer program into an executable binary is aided by a symbol table that stores information about variables, functions, etc. Once assembly is complete, this symbol table is typically removed from the executable binary to conserve memory space. The absence of the symbol table information makes resolution of ambiguities in decoding the machine instructions significantly more difficult.

Another useful application of disassembly is in detecting vulnerabilities in a computer program. Flaws or errors exist in almost every computer program, and are generally referred to as software bugs. Software bugs can arise from incorrect design, coding, and/or assembly of computer programs. Following good practices in software design, coding, and testing reduces software bugs, but it cannot eliminate them. Vulnerabilities result when latent bugs can be deliberately triggered to cause the software to execute in an unintended way. While some vulnerabilities can be seen in the arrangement of machine instructions and data in an executable binary, it is far easier to detect them in the original higher-level programming language. A common approach for uncovering vulnerabilities in a computer program is therefore to disassemble the executable code and examine the layout of the computer program and how input to the computer program could be used to affect its execution. Therefore, Improvements to disassembling the executable binary of computer programs in order to better detect and prevent the exploitation of the vulnerabilities within them are desired.

SUMMARY

In one aspect, a method useful for disassembling an executable binary includes the steps of runtime monitoring of an application executing on a computer system. The method includes the step of capturing an application programming interface (API)/system call performed by the application. The method includes the step of capturing a control transfer in the application. The method includes the step of generating a list of collected events. The list of collected events includes at least one of the API/system call or the control transfer. The method includes the step of transferring the list of collected events to a disassembler. The method includes the step of, with the disassembler, generating a set of disassembly traces for the executable binary by starting a disassembly operation at one or more potential start locations. The method includes the step of validating the set of disassembly traces by checking a consistency with a set of observed events that are in a memory region covered by the set of disassembly traces. The method includes the step of combining a set of validated disassembly traces to complete the disassembly operation on the executable binary.

In another aspect, method useful for monitoring of an API/system call implemented by an application for generating disassembly of an executable binary of the application, includes the steps of scanning a computer system for an executable application. The method includes the step of scanning the computer system for a running process associated with the executable binary. The method includes the step of initiating an application programming interface (API) call monitoring method that associates an observed API/system call with the executable binary. The method includes the step of reporting a set of collected events to a local server.

In yet another aspect, a method useful for disassembling an executable code located after a control flow instruction, including the step of determining a potential size of a code as a difference between a control flow instruction and a start of a next execution trace. The method includes the step of initiating a disassembly trace for each memory address in a memory region of the application. The method includes the step of enforcing an alignment with a known API/system call observed in the memory region of the application. The method includes the step of enforcing a consistency between an argument supplied to the API/system call with another argument reflected in the disassembly trace.

Figure 1:
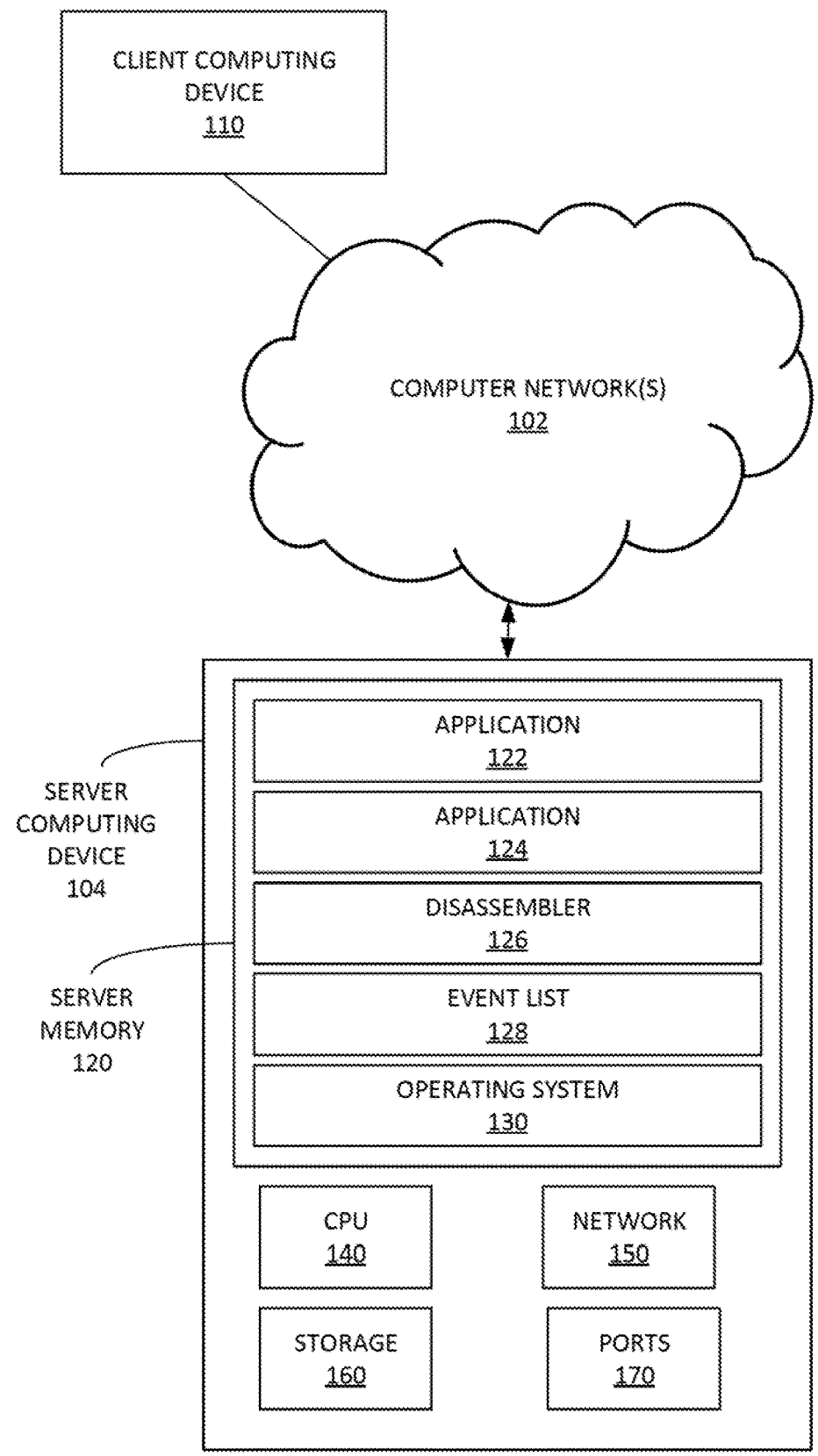
FIG. 1 illustrates a computer system for disassembling an executable binary, according to some embodiments.

The Figures described above are a representative set, and are not an exhaustive with respect to embodying the invention.

DESCRIPTION

Disclosed are a system, method, and article for disassembling executable code. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) is a set of subroutine definitions, protocols, and tools for building application software.

Control transfers in a computer program can be instructions that directs the flow of execution of the program. JMP, CALL, RET, IRET, and INT are examples of control transfer instruction.

Data link layer (DLL) refers to a layer in the OSI network architecture model

Disassembler can be a computer program that translates machine language into assembly language—the inverse operation to that of an assembler.

Executable applications can be files that contain computer program that can be executed on a computer. An executable application file has a specific format that enables the computer to load the file into memory and execute instructions in the file.

Hooking refers to a range of techniques used to alter or augment the behavior of an operating system, of applications, or of other software components by intercepting function calls or messages or events passed between software components. A software hook can be a set of code that handles such intercepted function calls, events or messages.

Hypervisor can be computer software, firmware or hardware that creates and runs virtual machines.

Last branch records (LBRs) can be a list of control flows most recently taken during the execution of a computer program.

RET can be an instruction in the x86 assembly language.

Exemplary Systems and Methods

In one example embodiments, a method for disassembling executable binaries informed by data collected at runtime is provided. Applications executing on a computing system is monitored at the instruction level to log control transfer and application programming interface (API)/system call events. Information from these events is used to validate disassembly traces and generate correct disassembly of the executable binary.

In one embodiment, runtime information about API/system calls made by the application and computed control transfers is used in the monitored application to improve disassembly. Using runtime information for improving disassembly of an executable binary can enable the discarding of incorrect disassembly traces. The result is a more accurate and efficient disassembly of the application executable binary.

In one embodiment, the code of an application executing on a computer system is monitored and analyzed locally. For example, a set of software hooks are placed in and/or outside the application to monitor API/system calls and/or computed control transfers during program execution. During the execution of the program, information about observed API/system calls and/or computed control transfers can be collected. The application binary can be disassembled using a disassembler. The disassembler can use the API/system call locations and control transfers to validate disassembly traces.

In another embodiment, the code of an application executing on a computer system can be monitored locally and analyzed remotely. For example, software hooks can be placed for monitoring API/system calls and computed control transfers during program execution. During the execution of the program, information about observed API/system calls and control transfers is collected by the system hooks. The collected information can be reported to a remote server. The application binary can be disassembled by the remote server using a disassembler. The disassembler can be use the API/system call locations and computed control transfers to validate disassembly traces.

FIG. 1 illustrates a computer system 100 for disassembling an executable binary, according to some embodiments. Computer system 100 includes a client computing system 110. Client computing system 110 can execute a range of applications (e.g. applications 122 and 124, etc.). Memory 120 of client computing system 110 can execute disassembler process 126. Disassembler process 126 can disassemble executable binaries. Disassembler process 126 can be implemented as an application, kernel module, a hypervisor, a dynamic linked library (DLL), etc. Disassembler process 126 can monitor the set of applications executing in the memory 120 of client computing system 110. Disassembler process 126 can apply static and/or dynamic methods to instrument the target application 122 (e.g. an application image, etc.). Disassembler process 126 can monitor API/system calls and control transfers. Event list 128 can be generated. Application 122 can be disassembled using event list 128. Event list 128 can be a set of API/system calls executed by the application. An event in the event list shows the memory location of the API/system call or control transfer and its description. In one embodiment, the monitoring of the control flows within and API calls made by application 122 can be are part of disassembler process 126. In another embodiment, disassembler process 126 and the monitoring components can be separated modules in memory 120.

Client computing system 110 can include additional components including, inter alia: central processing units 140, storage devices 160, network devices 150, input/output ports 170, etc. It is noted that, while client computing system 110 is illustrated with a single CPU, storage device, network device, and input/output port, it should be apparent to anyone skilled in the art that the present invention can be implemented in many different configurations of the computing system and incorporate more than one of the individual additional components. Client computing system 110 can further include random-access memory (RAM), erasable programmable read-only memory (EPROM), read-only memory (ROM), compact disk ROM (CD-ROM), storage area network (SAN), dynamic random-access memory (DRAM), or any other storage medium that can be accessed by client computing system 110.

Figure 2:
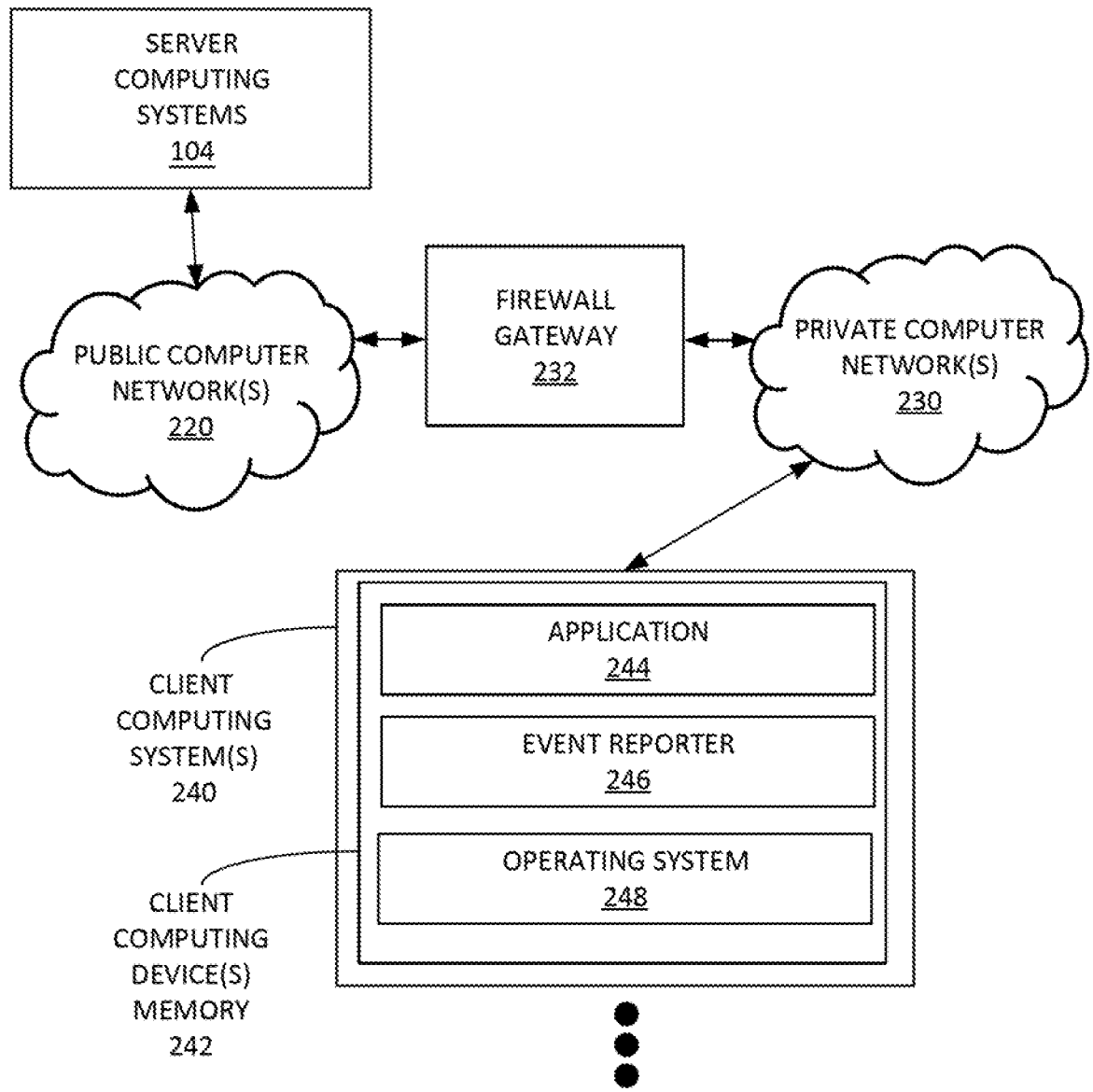
FIG. 2 illustrates a networked computer system for disassembling an executable binary, according to some embodiments.

FIG. 2 illustrates a block diagram of a computer network system 200, according to some embodiments. Computer network system 200 can include server computing device 104. Computer network system 200 can include one or more networked client computing device(s) 240. Client computing device(s) 240 can include client computing device memory 242. client computing device memory 242 can include one or more computer executable applications 244, event reporter 246, and operating system 248. Client computing device(s) 240 can be communicatively coupled with another computer(s) (e.g. server computing device 104, etc.) through public network 220 (e.g. the Internet, etc.) and private network 230 (e.g. a firewall gateway 232, etc.). Private network 230 can be between the client computing device(s) 240. Private network 230 can include multiple components such as, inter alia: routers, switches, firewalls, content filters, proxies, other hardware that route the data transmitted between client computing device(s) 240, etc. Client computers 240 can be computing devices such as, inter alia: personal computers, notebook computers, workstations, servers, smartphones, and the like. It is noted that, while the computer system 100 depicts a single client computer and a single server, the embodiments of the computer network system may contain multiple instances of each.

In one embodiment, the event list 216 can be continually updated (e.g. based on a periodic cycle and/or specified triggers, etc.) as client computing device(s) 240 execute applications. Event reporter 246 can implement an application event report process that monitors every control transfer and API/system call. Event reporter 246 can periodically communicate with the server computing system 104 to upload said events. For example, an event can include the location of a control and the target of the control transfer. Another example of an event is location and type of a system/API call.

In another embodiment, this information can be collected by executing the applications or an individual control transfer point in a monitoring mode. Each executing application can be observed for control transfers and API/system calls and the collected information is reported to the server computing system 104. Server computing system 104 analyzes the collected data for any given application for consistency with other samples collected from the set of clients. The samples can also be collected via direct execution of applications in a controlled environment. An event list can be created if all observations of control transfers and API/system calls in an application are consistent with each other. The updated event list can be used by disassembler process 126. While the embodiment discussed here relies on server computing system 104 to perform the analysis of events and the disassembly of the executable binary, the analysis of collected events in an application and the generation of disassembly can also be performed locally at the client computing device 240 in some example embodiments.

It is noted that the disassembly of an executable binary can be based on an event list 128. The event list 128 can be stored locally or downloaded from server computing system 104 by the disassembly process. Event list 128 contains rules for each application, and these rules depend on the version and characteristics of the application. An event may specify the source and destination address of a control flow or the type and location of an API/system call. In one example, two different versions of the same application can have different events. The disassembly process can load event list 128 and the image of the application to be disassembled into memory. In one example, the disassembly can be performed by starting disassembly traces at the target of control transfers, the instruction after an API call instruction, and at known functions from the symbol table.

Correct disassembly of an executable binary may not require completeness in monitoring API/system call and control flow events. The disassembler can resolve just enough control transfers in the application and API calls made by that application to allow incorrect disassembly traces to be discarded. The disassembly process can be successful even without access to the symbol tables for that application. It is not necessary to resolve every control transfer in the application or API/system call made by the application in order to correctly disassemble the application.

Figure 3:
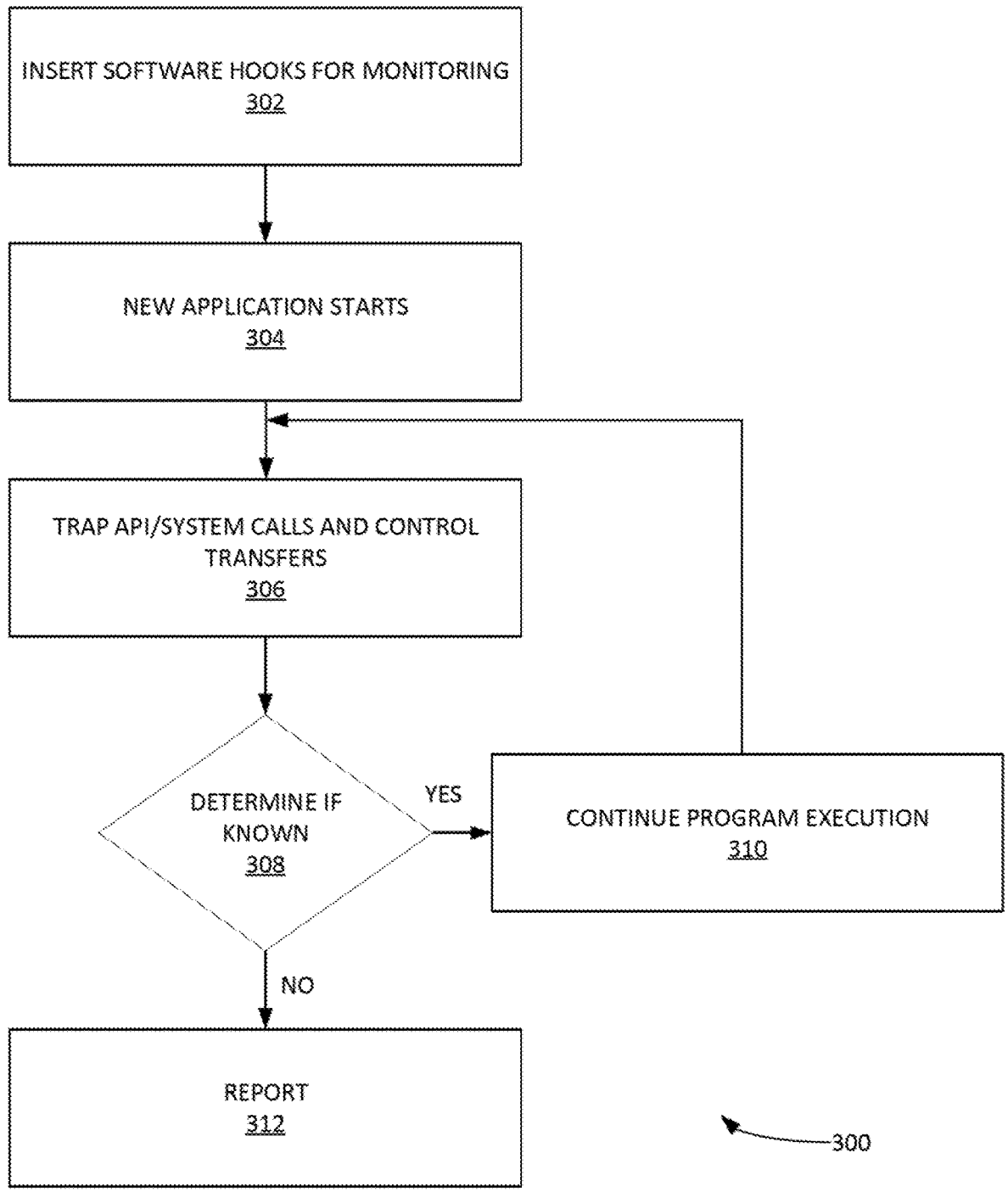
FIG. 3 illustrates an example monitoring process used to generate events used in disassembling an executable binary, according to some embodiments.

FIG. 3 illustrates an example monitoring process 300 used to generate events used in disassembling an executable binary, according to some embodiments. Monitoring process 300 can monitoring of control flows and API calls during the execution of applications. In step 302, monitory process 300 can insert software hooks (and/or other probes) for monitoring. For example, step 302 can inserts software hooks into the operating system, hypervisor, processor microcode and/or the application at runtime. The software hooks can also be inserted via static and/or dynamic instrumentation of an application executable. In another embodiment, the monitoring of API/system calls and control transfers can be done from a hypervisor by inserting software hooks into the memory pages of the application process.

In step 304, an application processes can be started on a client computer. Monitoring process 300 can enumerate applications on the client computer (e.g. client computing system 240) by scanning the storage media attached to the client computer and/or by implementing step 306. Monitoring process 300 can monitor application processes starting on the client computer.

In step 306, monitoring process 300 can trap API/system calls and control transfers. Control transfers during the execution of the application and API/system calls made by the application can be recorded as events. To prevent redundant reporting of events, observed events can be checked against a list of known events produced by the application.

In step 308, it can be determined if the observed event is known. If step 308 returns 'yes', then in step 310, the program execution continues without reporting the event in 320. Monitoring process 300 can then return to step 306. If the monitoring process encounters a new event produced by the application, that event is reported in step 312. To improve the efficiency of the reporting process additional processing, such as compression, can be applied to the events. The events could also be transmitted to an event aggregator before they are reported to the server (e.g. server computing system 104).

Figure 4:
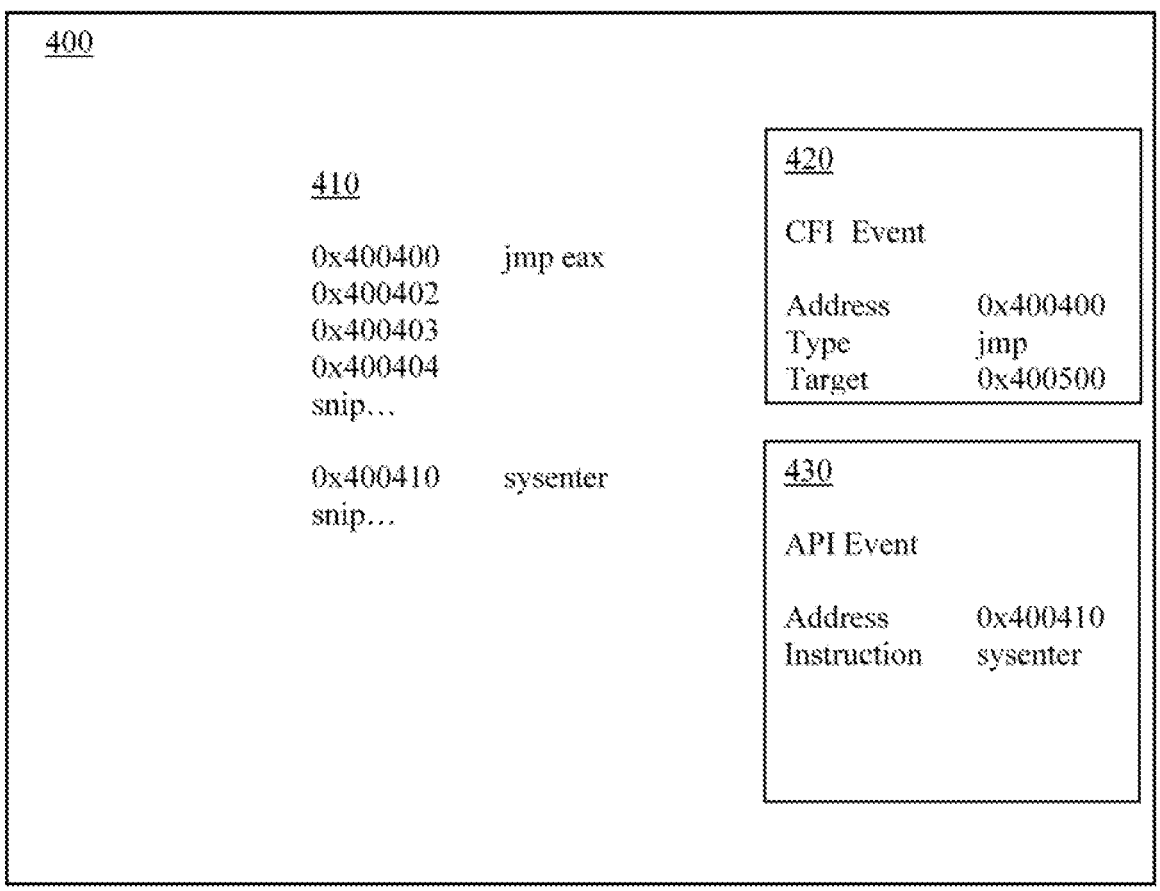
FIG. 4 illustrates the format of the events reported for improving disassembly of an executable binary, according to some embodiments.

FIG. 4 illustrates the format of the events reported for improving disassembly of an executable binary, according to some embodiments. Probes (e.g. software hooks, etc.) can be inserted into an operating system and/or the application to capture events representing control transfer and/or API/system calls. A control flow event 420 can capture, inter alia: the location address of the control flow (e.g. 0x400400), type (e.g. jmp), target of the control flow (e.g. 0x400500), register values, etc. An API call event 430 can capture the address (e.g. 0x400410), instruction (e.g. sysenter), register values, etc. In the present example, the disassembly of application 410 shows the code at address 0x400400 that matches the control flow event. Similarly, the disassembly at 0x400410 matches with the API/system call observed. As part of the event capture additional information may be collected to improve the analysis. Examples of such information include recent branches taken by the program, collected by the branch recording feature in modern microprocessors and, to validate the call trace leading up to the API/system call, the application stack at the time of the event capture.

Figure 5:
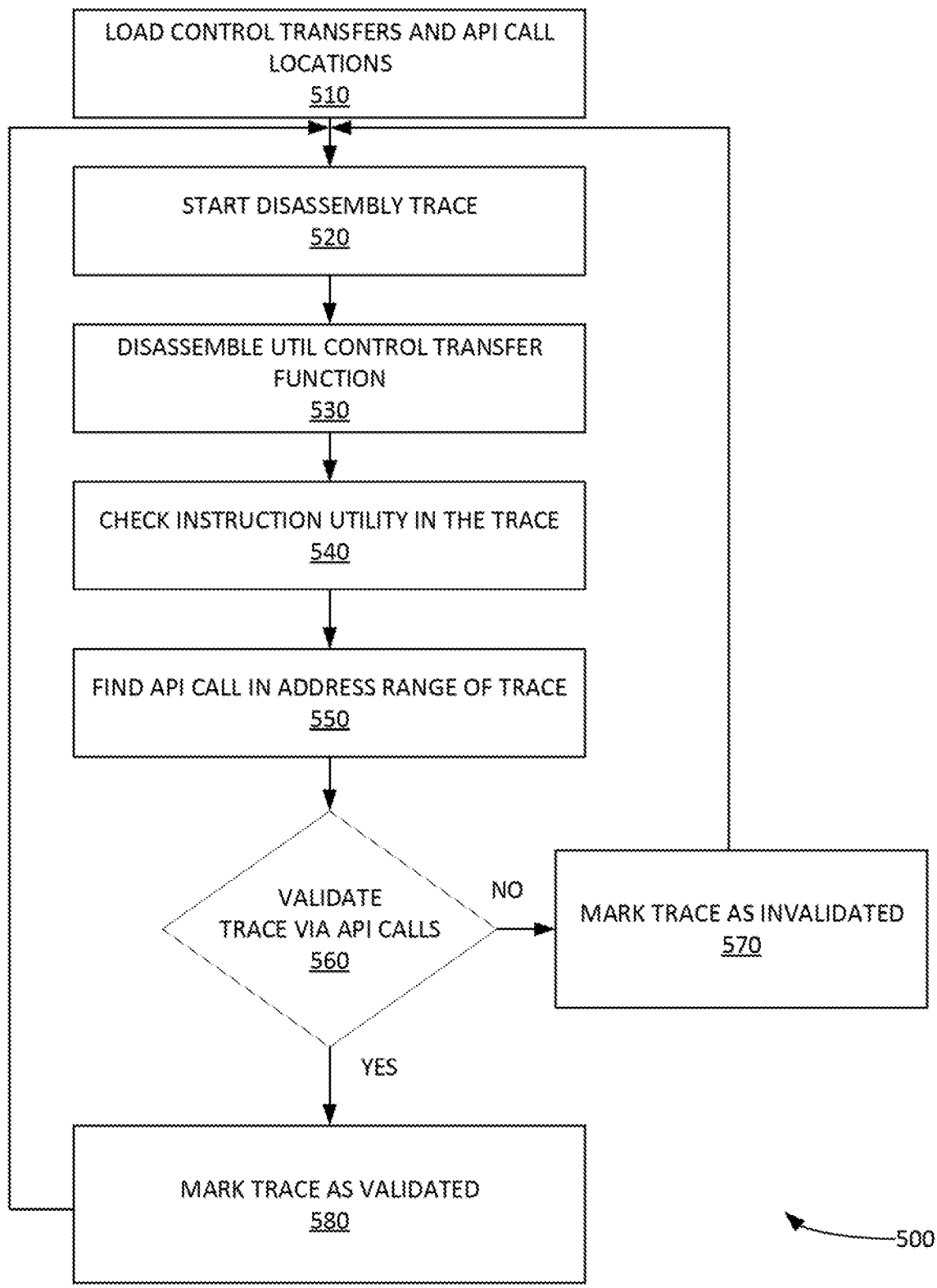
FIG. 5 illustrates an example process for disassembly, according to some embodiments.

FIG. 5 illustrates an example process 500 for disassembly, according to some embodiments. The disassembly of the executable binary of an application can be achieved by combining the information from the events collected by the monitoring tools at the client with a recursive disassembly method. The collected events can be used to validate disassembly traces and to identify and initiate new disassembly traces. At the start of the disassembly for any given executable binary, the list of all known control transfers and API/system call locations is loaded by the disassembler in step 510. If the symbol table is present in the executable binary, then that, too, is loaded by the disassembler.

The disassembler begins the disassembly of the executable binary by starting at one or more entry points into the executable in step 520. The start points for new disassembly traces include known locations of functions from the symbol table, if present, and targets of resolved control transfers. From each starting point disassembly continues via the linear sweep algorithm until the disassembly trace reaches a validation point or a branch (e.g. see step 560 infra). The trace grows as long as the disassembler is able to match the next instruction-length pattern in the binary against valid instructions in the table of known instructions for the relevant processor. The disassembly instruction trace produced can include sequential flow instructions such as XOR, POP, PUSH, ADD, etc. If the disassembler locates a set of bytes to which it cannot assign a valid instruction, it discards the trace. Next a check on the alignment of the disassembled instructions with the known API/system calls and control transfers is enforced. If the disassembled instruction type and location match with a known API/system call, the disassembly trace can be considered valid and the disassembler linear trace continues. If the disassembly trace conflicts with a known API/system call, then that trace can be discarded. A conflict can result when there is overlap in the memory range occupied by the disassembled instruction and the observed API/system call.

In one example, process 500 can check instruction utility in the trace in step 540. Process 500 can find an API call in the address range of trace in step 550. Process 500 can validate trace via API calls in step 560. If 'yes', then in step 580, process 500 can mark the trace as validated and return to step 570. In 'no', then process 500 can mark the trace as invalidate in step 570 and return to step 570.

Figure 6:
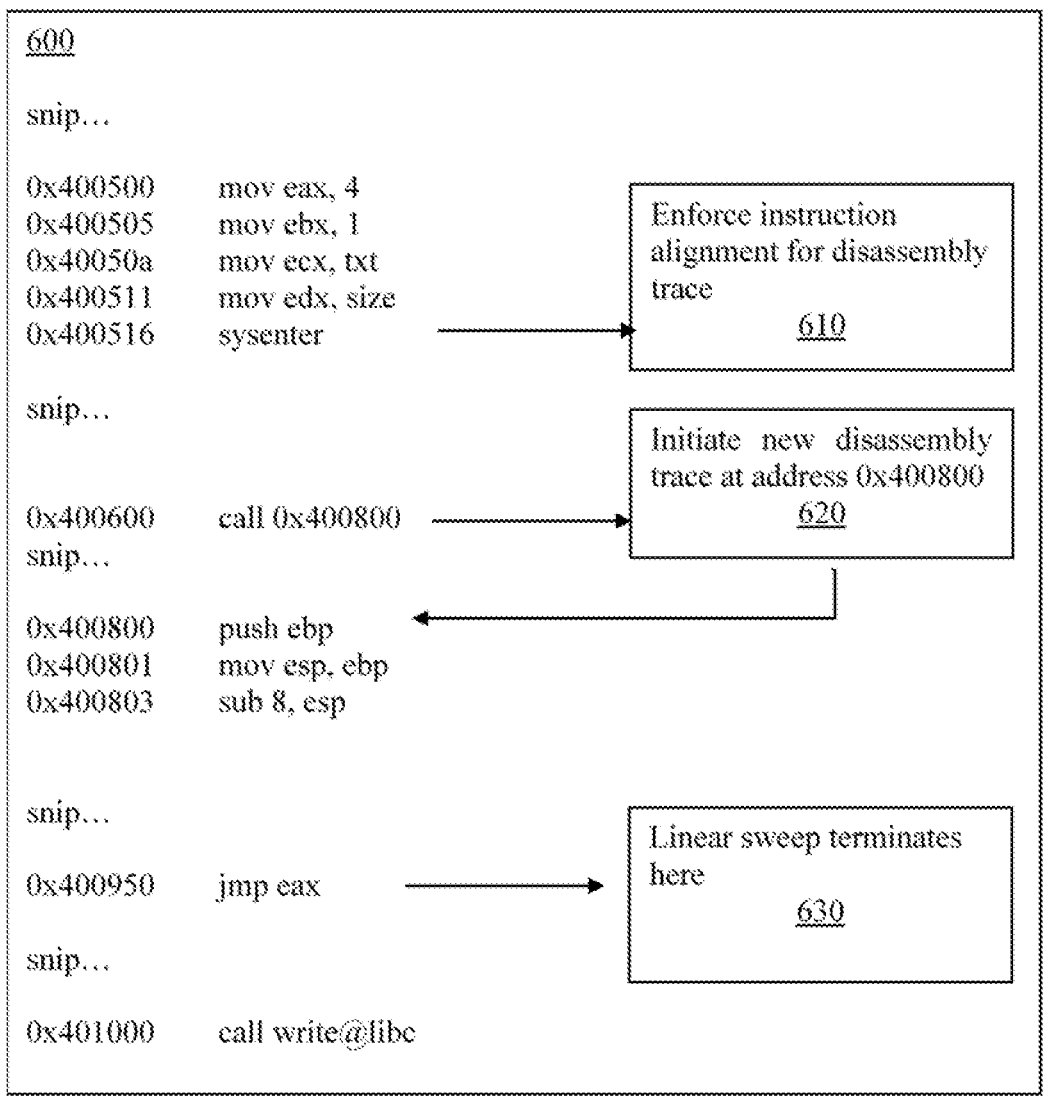
FIG. 6 shows a process illustrating how disassembly traces are initiated, terminated, and validated according to some embodiments.

FIG. 6 shows a process 600 illustrating how disassembly traces are initiated, terminated, and validated according to some embodiments. Multiple disassembly traces can be generated and merged together to produce a final disassembly of the application. In some examples, the start and end of a disassembly trace are each a control transfer instruction. Observed API/system call events can be used to validate disassembly traces in step 610. The disassembly of the application binary shows a sysenter API call at memory location 0x400516 in step 610. For the disassembly trace to be marked as validated, there can be a reported event that is compatible with a sysenter call at that memory location. While the current example uses the sysenter system call, the validation can be based on any other API/system call as well as this example is provided by way of illustration and not limitation.

Once an event is determined to be consistent with the disassembly trace, that trace can be marked as validated. The converse may not hold true if the monitoring is not complete and such an event has not been observed. In the case where there is neither a match with a known API/system call nor a conflict, the disassembly trace can be marked as not validated. The disassembler initiates several disassembly traces with the start of the first disassembly trace for any executable binary typically the entry point into the executable. The start address of known functions is another way to initiate new disassembly traces. Additional disassembly traces can be started when a branch or control transfer is resolved. The instruction at 0x400600 represents a call to a function at the address 0x400800 in step 620. A function call to another location in the program may imply that program execution can begin at the target location. The disassembler can then initiate a new disassembly trace at the address 0x400800 and continue a linear sweep of the disassembly trace that includes the function call. One reason for continuing linear sweep is that return from a CALL instruction may be at the subsequent instruction.

It is noted that not all branch instructions can be statically determined. The jmp instruction at 0x400950 is an example of a branch instruction that cannot be determined via static analysis. When the instruction at the address 0x400950 is executed, program execution jumps to an address determined by the value of the eax register. To resolve the target of the branch and initiate a new disassembly trace, a software interrupt (INT 3) is inserted at the location of the computed branch instruction. When the software interrupt is triggered, the value of variables (e.g. eax register in the present example, etc.) can be recorded and an event is reported. Once the computed branch instruction is resolved, the software interrupt can be removed. Once the target address of the branch is resolved, the disassembly can initiate a new disassembly trace at the target address.

Other methods for inferring control transfer can include, but are not limited to, the use of last branch records (LBRs) and protecting code pages to generate a page fault when target code is reached. Errors in the linear sweep algorithm may occur due to branches in the code. In some examples, where a disassembly trace is terminated at a branch instruction as the data bytes following the branch instruction may not comprise a valid instruction. Encountering a RET instruction that represents the end of the function is one example. Due to padding between functions, there may not be a guarantee that the instruction following a RET instruction is a valid instruction, and the preamble to the new function may start at one of the subsequent instructions. However, the function following the RET instruction can be disassembled by another disassembly trace, as a new trace may be initiated at the correct location when a call to that function is encountered by that trace.

In another example, a disassembly trace may have to be terminated is a computed control transfer. FIG. 6 illustrated a computed jump instruction at address 0x400550. The jump can be via the value stored in the eax register, a value that cannot be determined via static analysis, consequently the jump is non-deterministic. Unlike for a CALL instruction, there may be no guarantee that the return from the computed jump will be at the address following the jump. Therefore, the disassembler terminates the disassembly trace.

Figure 7:
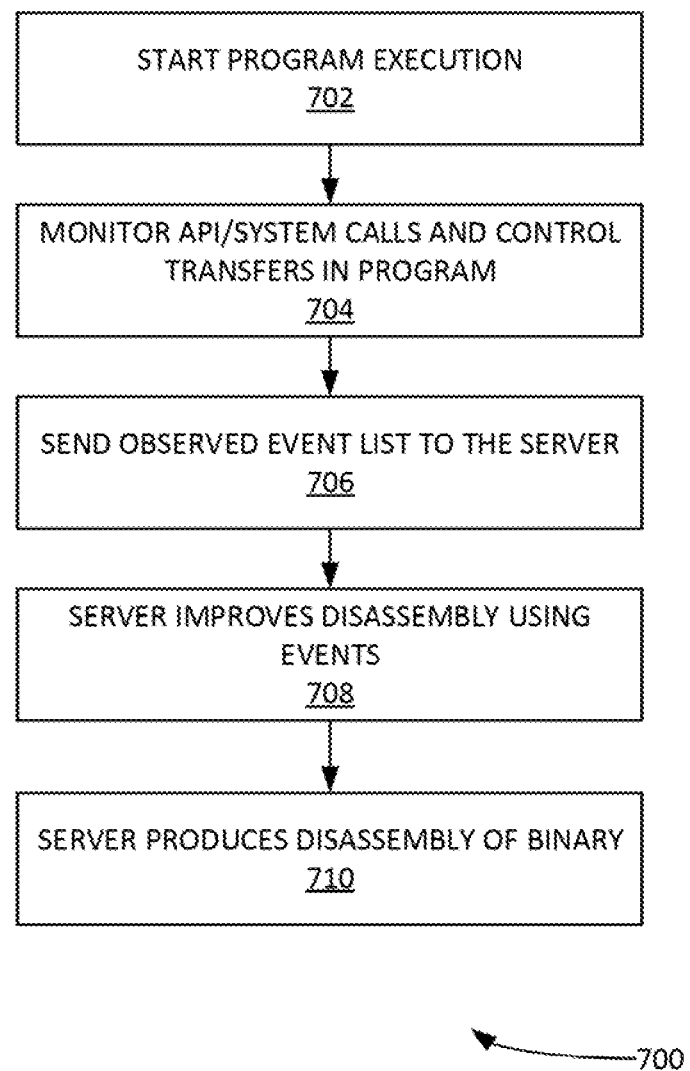
FIG. 7 illustrates an example process for reporting of events for improving the disassembly of an executable binary, according to some embodiments.

FIG. 7 illustrates an example process 700 for reporting of events for improving the disassembly of an executable binary, according to some embodiments. A program can begin execution in step 702. Applications executing on a computing device can be monitored for API calls and control flow in step 704. The collected events can be transmitted to a remote computing server that performs the disassembly of the executable binary in step 706. The server improves the disassembly using events in step 708. The disassembly mechanism can use collected events to validate disassembly traces and to initiate new ones. Server produces a disassembly of the binary in step 710. For example, collected events can be used to validate disassembly traces and validated disassembly traces are combined to produce the disassembly of the executable binary. Collection of a sufficient number of events can produce correct disassembly of the application without relying on heuristics. There may be instances when the disassembly of the executable binary is not complete.

Figure 8:
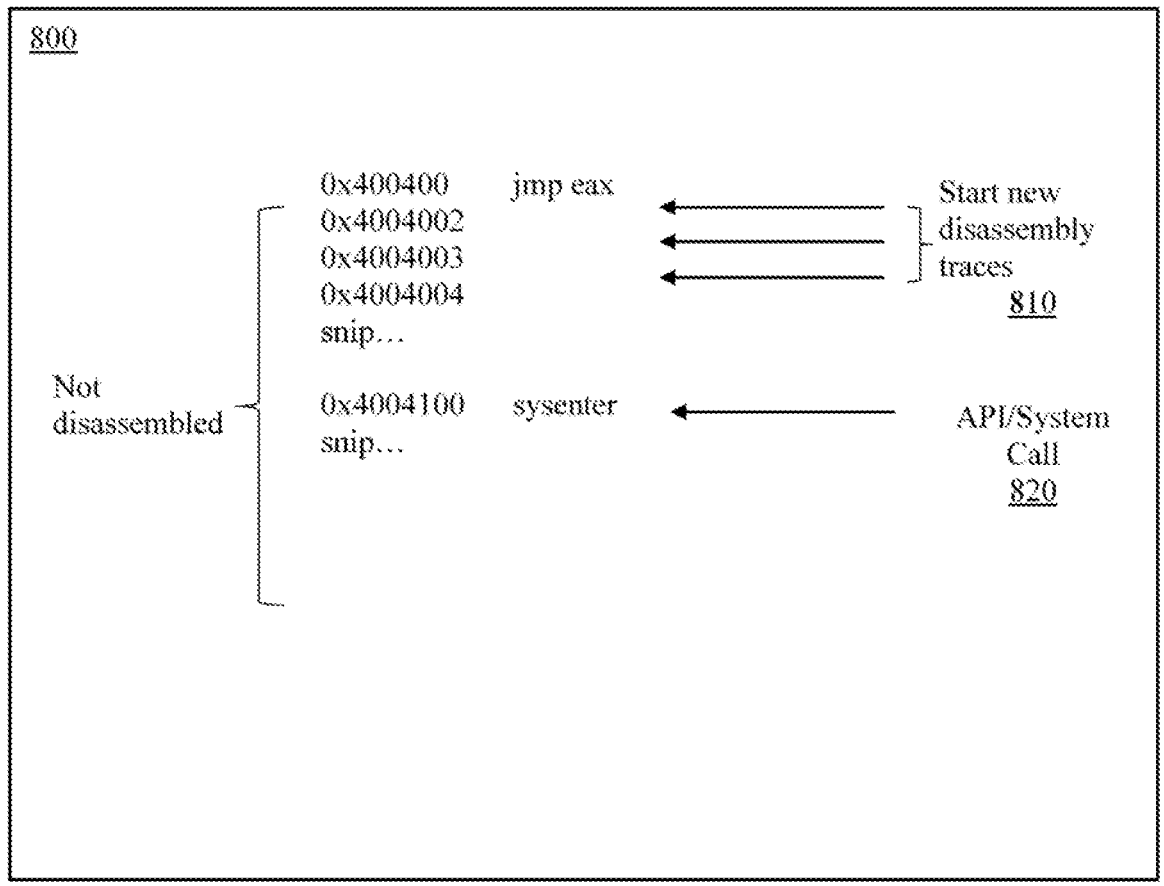
FIG. 8 illustrates an example area in the executable binary that has not been disassembled, according to some embodiments.

FIG. 8 illustrates an example area 800 in the executable binary that has not been disassembled, according to some embodiments. The area that has not been successfully disassembled can either terminate at the start of another disassembly trace or can extend all the way to the end of the section. If the collected events location corresponds to that area, then a deterministic algorithm is applied to correctly disassemble that area. New disassembly traces 810 are started at each instruction following the computed control transfer until we encounter the end of the section, a collected event, or a start point for another disassembly trace. Linear sweep disassembly can be started at each of those points and validation checks are performed. The correct disassembly traces can be consistent with observed API/system calls and control transfer events 820.

Figure 9:
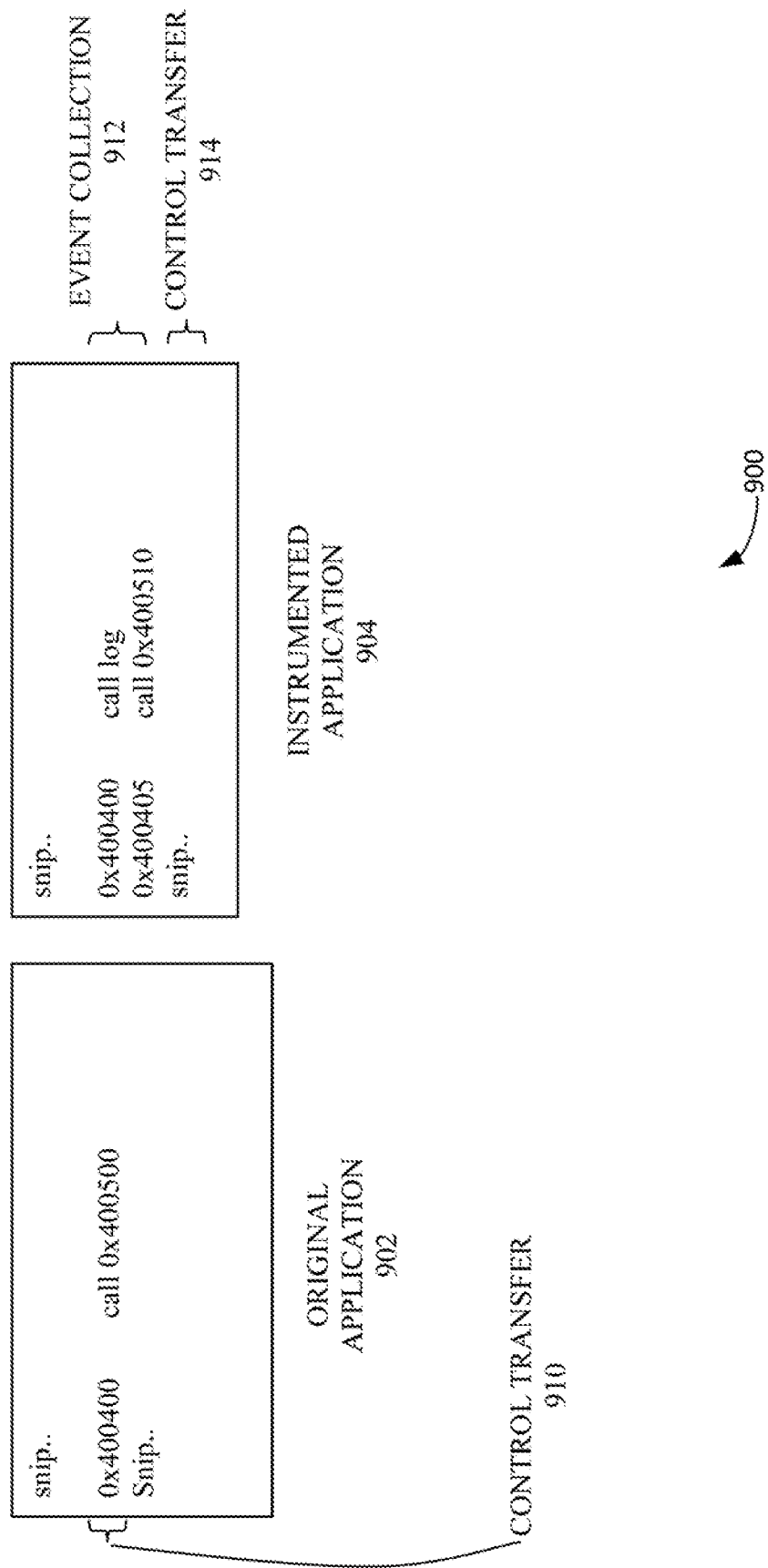
FIG. 9 shows one embodiment of the application image instrumentation for event collection, according to some embodiments.

FIG. 9 shows one embodiment of the application image instrumentation for event collection, according to some embodiments. When a control transfer is based on a computed variable, an event cannot be created by static analysis of the application executable. By examining the control transfer value during execution, it becomes possible to create a rule. In accordance with one aspect of the present invention, the application binary can be instrumented with inserted code for monitoring values of control transfers. When a sought-after value is observed, the value can be used to create a rule locally or reported to the rule server. FIG. 9 shows one embodiment of application control transfer monitoring. The program is executed in a controlled environment 900. Instrumentation can be static or dynamic. Control transfers 914 in the program are monitored and logged 912. Collected events are transmitted to the server. The rule server analyzes collected events. New events are created and added to the event list for the disassembler. The original image 902 has a control transfer 914 at memory location 0x400400 that points to memory location 0x400500. In the instrumented image of that application 904, an event collection code 912 is inserted before the control transfer. The control transfer has moved 914 to a new memory location. During program execution, the event collection captures the associated information before permitting the control transfer.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method useful for disassembling an executable binary comprising the steps of:
   runtime monitoring of an application executing on a computer system;
   capturing an application programming interface (API)/system call performed by the application;
   capturing a control transfer in the application, wherein control transfer is implemented by inserting software hooks into the memory pages of the application process;
   generating a list of collected events, wherein the list of collected events comprises at least one of the API/system call or the control transfer;

transferring the list of collected events to a disassembler;
with the disassembler:
   wherein the dissembler comprises a program that translates machine language into assembly language,
   generating a set of disassembly traces for an application executable binary by starting a disassembly operation at one or more potential start locations;
   validating the set of disassembly traces by checking a consistency with a set of observed events that are in a memory region covered by the set of disassembly traces, wherein the set of observed events are checked against a list of known events produced by the application; and
   combining a set of validated disassembly traces to complete the disassembly operation on the application executable binary.

2. The method of claim 1, wherein an event information includes a processor register value, an application attribute, an application symbol table, an application's stack, and a processor's last branch records.

3. The method of claim 1, wherein collected events are reported to a remote server for use in disassembly of the application executable binary.

4. The method of claim 1 further comprising the step of monitoring and reporting of a control flow in the application for generating disassembly of the application executable binary by:
   scanning the computer system for a running process associated with the application executable binary;
   instrumenting an application code of the executable application to monitor a control flow;
   inserting event-logging code into the executable application to monitor the control flow;
   inserting a software interrupt into the executable application to monitor the control flow logging a collected event reflecting a characteristic of the control flow; and
   reporting the collected event to a server.

5. The method of claim 4, wherein a potential size of the memory region is bounded by a code section boundary.

6. The method of claim 5, wherein the validation code is part of an operating system.

7. A method useful for monitoring of an API/system call implemented by an application for generating disassembly of an application executable binary of the application, comprising the steps of:
   scanning a computer system for an executable application;
   scanning the computer system for a running process associated with the application executable binary;
   initiating an application programming interface (API) call monitoring method that associates an observed API/system call with the application executable binary; and
   reporting a set of collected events to a local server, and wherein the set of collected events are used to validate a disassembly trace and to identify and initiate a new disassembly trace,
   wherein the observed API/system call is reported to a remote server,
   wherein the observed API/system call is validated by matching a pointer type with the API/system call,
   wherein the observed API/system call is used to validate the disassembly of an application executable binary, and
   wherein the API/system call is monitored from the application, an emulator, or a hypervisor.

8. The method of claim 7, wherein the API/system call is further validated by checking the consistency of a disassembled code with an argument used by the API/system call.

* * * * *